March 22, 1932. P. CARLSON 1,850,705
VEHICLE TOP
Filed March 5, 1931
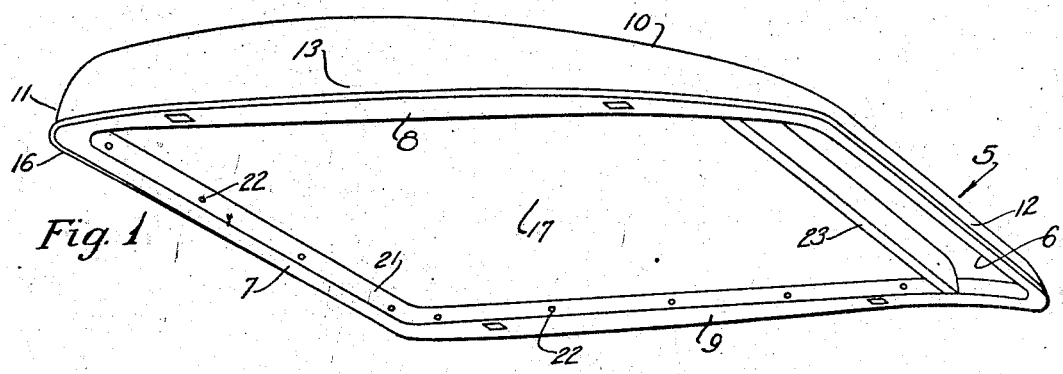
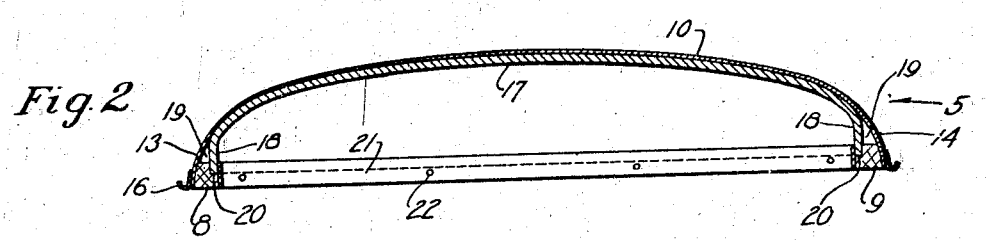
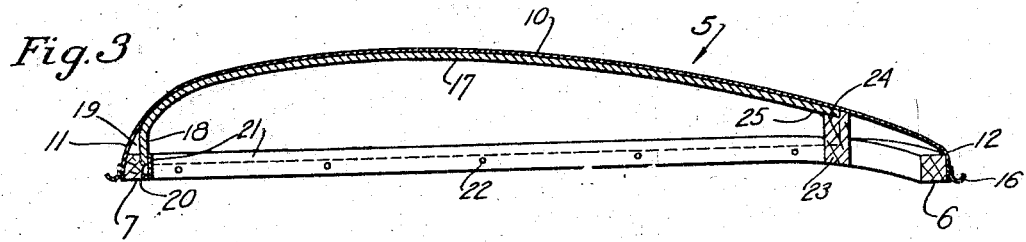
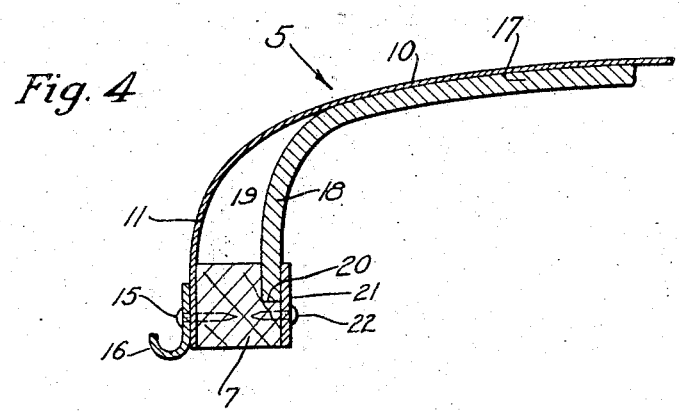
INVENTOR
PHILIP CARLSON.
BY
ATTORNEY Patented Mar. 22, 1932

1,850,705

UNITED STATES PATENT OFFICE

PHILIP CARLSON, OF LONG HILL, CONNECTICUT, ASSIGNOR, BY MESNE ASSIGNMENTS, TO THE BRIDGEPORT-CITY TRUST COMPANY, OF BRIDGEPORT, CONNECTICUT, A CORPORATION OF CONNECTICUT

VEHICLE TOP

Application filed March 5, 1931. Serial No. 520,237.

This invention relates to new and useful improvements in vehicle tops and in certain particulars may be considered an improvement over the vehicle top shown in my application Serial Number 428,731, filed February 15th, 1930.

An object of the invention is to provide a vehicle top, particularly an automobile truck cab top, including a wooden frame and a cover or shell over said frame and secured to the outer sides thereof and a liner for the shell and cemented or glued to the inner surface thereof over a large area thereof and having its edge portions secured against the inner sides of the frame whereby to provide an insulator for the top and at the same time completely finish the interior thereof.

Other objects and advantages will become apparent from a consideration of the following detailed description taken in connection with the accompanying drawings wherein an embodiment of the invention is shown. It is to be understood however, that the invention is not limited to the details shown and described but comprehends all such modifications and variations as may fall within the scope of the appended claim to which reference must be had for a definition of the limitations of the invention.

In the drawings:

Figure 1 is a perspective view from the underside showing a complete top made in accordance with the present invention;

Fig. 2 is a transverse sectional view through the complete top;

Fig. 3 is a longitudinal sectional view through the top; and

Fig. 4 is a sectional view on an enlarged scale showing the connection of the shell and liner with the top frame.

Referring in detail to the drawings, the improved top generally designated 5, comprises a substantially rectangular wooden frame including relatively heavy front and rear bars 6 and 7 and relatively heavy side bars 8 and 9 connecting the front and rear bars. Since the frame is formed of relatively heavy material it will, of course, be quite rigid. However, the frame being formed of wooden bars will have a certain resiliency or yielding quality whereby it may give when a truck on which it is mounted is moving over uneven ground but will not be permanently distorted. This is true since the frame will have the quality necessary in order that it return to normal position when forced from such position.

Disposed over the substantially rectangular wooden frame is an outer portion or shell 10 formed of a single imperforate metal sheet arched from front to rear as clearly shown in Fig. 3 and arched from side to side as most clearly shown in Fig. 2. Shell 10 encloses the frame and has its downwardly extending or rear edge portion 11 disposed against the outer side of the rear bar 7 of the frame and has its downwardly extending or forward edge portion 12 disposed against the outer side of the forward bar 6 of the frame.

As clearly illustrated, three edge portions of the liner 17 are received in a groove 20 formed in the upper inner edge portions of the bars 7, 8 and 9 forming three sides of the wooden frame. If desired, the edge of the liner may be nailed or tacked in place. However, I have shown a metal strip 21 of the width of the bars forming the frame, this strip being disposed against the inner sides of the three bars 7, 8 and 9 of the frame and securing the edge portions of the liner 17 in place in the groove 20. Screws or nails 22 may be used for securing the strip 21 in place.

Extending transversely of the frame, that is, between the bars 8 and 9, adjacent but spaced inwardly from the front bar 6 is a cross bar 23. This bar 23 forms a mounting for the windshield frame (not shown). Bar 23 is rabbeted or grooved as at 24 to receive the forward edge portion 25 of the liner as clearly shown in Fig. 3 and this bar also assists in holding the liner 17 against the inner side of shell 10 as will be obvious.

With this arrangement, it will be clear that the rectangular wooden frame which mounts or supports the metal shell 10 and the shell or liner of insulating material 17 is for the most part received between these two shells and concealed. That is, all portions of the frame rearwardly of the windshield are so received. The shell or liner 17 forms a complete finish for the interior of the top it being but necessary to enamel or paint the shell and it not being necessary to use any additional material or perform any additional labor in the finishing of the interior of the top.

Further, the downwardly extending or side portions 13 and 14 of the shell 10 are disposed against the outer side of the side bars 8 and 9 of the frame. From what has been said it will be apparent that the shell 10 completely encloses the bars forming the frame and means as for example nails or screws 15 may be employed for securing the shell to the frame. Further, a drip moulding 16 may be provided about the lower edge of the shell or covering member 10.

Since the member 10 is imperforate and of metal, it is moisture proof and to finish the exterior of the top it is but necessary to paint or enamel the same. However, the shell 10 being of metal will have a tendency to vibrate or drum and will also readily transmit heat. To prevent this a liner 17 of sound deadening and heat insulating material is provided. This liner as shown is preformed to fit within the shell 10 and is so shaped as to contact with the shell over a large area thereof at the inner side of the shell. This is clearly shown in Figs. 2, 3 and 4 and the shell and liner are rigidly cemented or glued together over this entire contacting area.

The laminated structure thus built up will not be subject to vibration or drumming and additionally will be a poor transmitter of both heat and cold. The edges or downwardly extending portions 18 of the liner 17 are as shown spaced from the edge portions or downwardly extending portions 11, 12, 13 and 14 of the shell 10 whereby an air space 19 is provided between the edge portions of the shell and liner.

Thus, it will be seen that the shell or liner 17 performs several functions. It acts as both a sound and heat insulator in that it prevents drumming of the metal shell and the transmission of heat therethrough to the interior of the cab and further acts as the finishing material for the interior of the top. It will also be apparent that the frame being enclosed between the two shells the frame within the cab does not form a shelf for the collection of dirt and dust and to prevent the same from forming such a shelf it is not necessary to line the top with upholstering material. Also, the lining 17 is not likely to become torn and it may be repainted at any time desired.

Having thus described the invention, what is claimed is:

In a vehicle top, a substantially rectangular wooden frame, an imperforate metal shell shaped to fit over said frame and having its edge portion secured against the outer sides of the frame in a manner to enclose the frame, a cross bar extending between opposite bars of said frame, said cross bar at its upper side engaging the inner surface of the shell, a liner of round insulating material for the shell, said liner comprising a preformed shell rigidly secured to the inner surface of the metal shell over a large area thereof, said frame having a recess formed in the upper portion of its inner side along three of its sides in the rear of the cross bar, said liner having substantially vertically disposed walls and having the lower edge portions of said walls spaced from the edge portions of the metal shell and arranged in said recess whereby the frame in the rear of said cross bar is disposed between the edge portions of the metal shell and the liner shell and whereby the body portion of the liner is pressed against the metal shell, said cross bar having a recess in its upper inner edge, said liner having its forward edge disposed in the recess in the cross bar, and a metal strip disposed against the inner sides of the frame and against the edge portion of the liner shell whereby to secure the same in the recess in the frame.

Signed at Bridgeport, in the county of Fairfield and State of Connecticut, this 18th day of February, A. D. 1931.

PHILIP CARLSON.